June 30, 1942.  W. A. FLUMERFELT  2,288,160
JOINT ASSEMBLY
Filed July 22, 1940
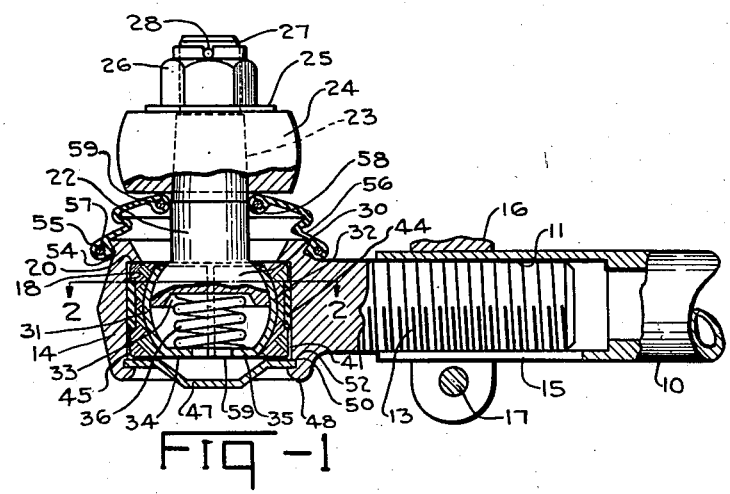
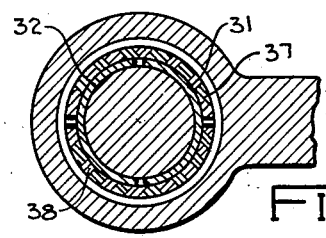 
Fig-2   Fig-3   Fig-4
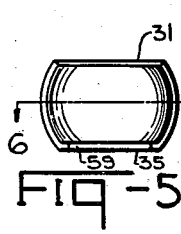 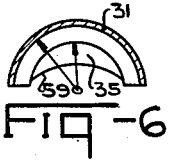 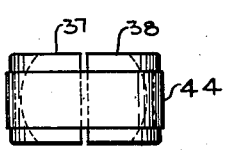 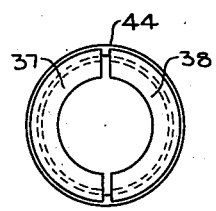
Fig-5   Fig-6   Fig-7   Fig-8
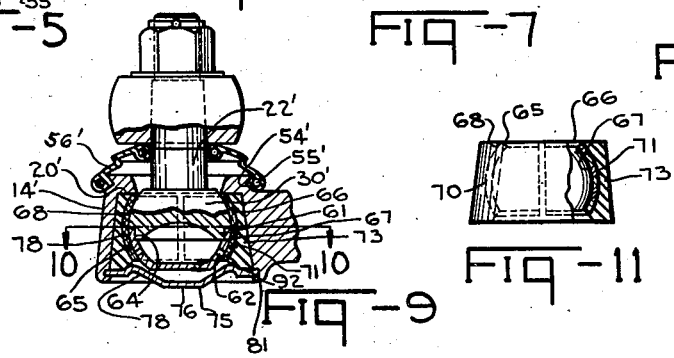
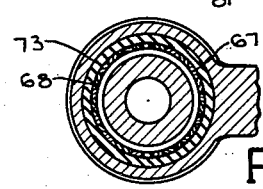
INVENTOR
William A. Flumerfelt
BY
Braselton Whitcomb Davies
ATTORNEY Patented June 30, 1942

2,288,160

UNITED STATES PATENT OFFICE 2,288,160

JOINT ASSEMBLY

William A. Flumerfelt, Columbus, Ohio, assignor to The Columbus Auto Parts Company, Columbus, Ohio, a corporation of Ohio Application July 22, 1940, Serial No. 346,676

5 Claims. (Cl. 287—90)

This invention relates to joint constructions and especially to articulated rod couplings of the type known as ball joints particularly adaptable for use in tie rod and drag link assemblies for automotive vehicles.

The invention embraces the provision of a joint assembly including a stud member made up of a plurality of units engageable with a non-metallic bearing means, the component parts of the joint assembly being held in operative position by resilient means.

The invention contemplates a joint construction in which the stud configuration is formed of a plurality of cup-like members surrounded by yieldably mounted bearing means in combination with resilient means acting upon the cup-like members to automatically compensate for any wear of the engaging bearing surfaces.

The invention comprehends a trouble-proof shock absorbing and self-adjusting joint construction in which is provided a metallic ball configuration which is engaged by non-metallic bearing seats yieldably mounted in the housing whereby rattling or objectionable noises between the parts are prevented and compensation for wear resulting from use is inherently accomplished.

The invention has for an object the provision in a joint assembly of bearing means formed of plastic material preferably resiliently mounted for rendering the joint not only shock absorbing, road cushioning and self-adjusting but also one having long wearing surfaces with minimum lubrication which does not require great accuracy in its manufacture as size variations of the bearing means of plastic material or the ball configuration is automatically compensated.

Another object of the invention resides in the provision of a joint structure embodying bearing seats made of phenol condensation product or material having similar characteristics, the bearing parts being urged into engagement with a ball configuration of a joint structure under the influence of yieldable means.

Another object of the invention is the provision of a ball joint structure in which the bearing elements forming the joint include non-metallic surfaces in engagement with metallic surfaces maintained in maximum bearing contacting surface under all conditions of operation regardless of the extent of relative movement therebetween.

A further object of the invention resides in the provision of a joint structure wherein one of the bearing elements is of a phenol condensation product or other suitable moulded plastic material having direct bearing engagement with a metallic element which combination requires a minimum of lubrication without impairing the life of the joint structure.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which Figure 1 is a vertical sectional view showing a joint construction of my invention;

Figure 2 is a horizontal sectional view taken substantially on the line 2—2 of Figure 1;

Figure 3 is an elevational view illustrating one of the bearing members of the joint structure;

Figure 4 is a horizontal sectional view of a bearing member taken substantially on line 4—4 of Figure 3;

Figure 5 is an elevational view of one of the members forming the ball configuration of the joint;

Figure 6 is a sectional view taken substantially on line 6—6 of Figure 5 looking in the direction of the arrows;

Figure 7 is an elevational view illustrating the assembly of the bearing seats and the yieldable support therefor;

Figure 8 is a top plan view of the elements shown in Figure 7;

Figure 9 is an elevational sectional view showing a modified form of joint structure;

Figure 10 is a horizontal sectional view taken substantially on the line 10—10 of Figure 9;

Figure 11 is an elevational view partially in section showing the bearing elements and yieldable mounting therefor of the modified form of the invention shown in Figure 9.

While I have illustrated the joint construction as especially adapted for a tie rod connection, it is to be understood that my invention may be used in any arrangement where it may be found to be applicable.

Referring to the drawing in detail and particularly to Figures 1 to 8, there is illustrated a form of joint construction especially arranged for use as a tie rod connection to the dirigible or steerable wheel of a vehicle in which 10 designates the tie rod of tubular configuration which is interiorly threaded at one end as at 11 to accommodate a threaded tenon 13 terminating into a hollow end head or joint housing 14. The wall of the tube adjacent tenon 13 is slotted longitudinally as at 15 and surrounding the tube is a clamp or collar 16 arranged to be drawn into clamping engagement with tie rod 10 by means of bolt 17 and nut (not shown), this means serving to lock the tie rod and joint housing in fixed relation. In this form of the invention, the hollow head or joint housing 14 is preferably formed having its interior wall 18 of cylindrical configuration forming the stud receiving chamber which extends substantially transverse to the axis of the tie rod and is provided at its upper extremity with an inwardly projecting annular shoulder or flange 20.

The joint construction includes a stud member 22 having a stem or tapered shank portion 23 adapted to receive an arm 24 which is connected to a dirigible vehicle wheel (not shown), the arm 24 being held in place by means of a washer 25 and a nut 26 engageable with a threaded tenon 27 integrally formed upon the upper end of stud 22, the nut being locked in position by means of a cotter key 28 or other locking means. The lower extremity of the stud 22 is formed with an enlarged curved section preferably of segmental spherical configuration 30 which projects into the interior of housing 14.

Located within the hollow interior of the housing 14 and substantially surrounding the segmental spherical portion 30 of the stud member is a pair of complementary metallic cup-like members 31 and 32 preferably formed of sheet metal which are longitudinally separated with respect to the axis of the housing 14. The outer lateral surfaces of members 31 and 32 are spherically shaped and the corresponding inner surfaces are arranged to conform with and engage the segmental spherically shaped portion 30 of the stud member which serves to properly space and position members 31 and 32 to form a substantially ball shaped configuration. The stud member is provided at its lower portion with a recess 33 and the members 31 and 32 are provided at their lower portions with inwardly extending flattened portions 34 and 35 arranged substantially on the same plane. Resilient means are interposed between the stud and the cup-like members 31 and 32 to hold the same in proper engagement with the novel bearing means of the invention, the resilient means being illustrated in the form of an expansive coil spring 36 fitting at one end into the stud recess 33 and having its other end engaging the flattened portions 34 and 35 of members 31 and 32.

One of the features of the invention resides in the bearing means and co-acting arrangement of the same with respect to the relatively movable elements of the joint construction such as the housing 14 and the metallic curved sections carried by or forming part of the stud 22. The bearing means of the invention comprise a bearing surface of non-metallic material. The bearing surface is preferably formed of a phenol condensation composition which may be of the general character commercially known as "Bakelite," or the same may be formed or moulded of suitable synthetic resin plastic or a plastic of the cellulose type. The non-metallic bearing surface is preferably backed up or mounted on a suitable cushioning member of yieldable material, the latter being of rubber, synthetic yieldable and compressible material, or one partaking the general characteristics of rubber.

In the embodiment of the invention illustrated in Figures 1 to 8 inclusive the ball-shaped configuration of the stud formed by the metallic members 31 and 32 is substantially surrounded by the bearing means of the invention which is shown in the form of two spaced semi-annular non-metallic bearing seats 37 and 38 made of a moulded synthetic resin plastic composition such as a phenol condensation product commercially known as "Bakelite." The bearing seats 37 and 38 each have a concave inner surface 39 of spherical configuration coinciding with and fitting the exterior surface of the metallic members 31 and 32. The combined exterior surface of the bearing seats 37 and 38 presents a cylindrical configuration and is provided with a centrally positioned annular groove or recess 41. Interposed between the exterior surfaces of the bearing seats 37 and 38 and the cylindrical wall of the housing and fitting within the recess 41 is a compressible member or cushion 44 of yieldable material which is preferably in the form of an annulus made of rubber or other compressible synthetic material. In this form of the invention the annular rubber cushion or yieldable member 44 has a thickness comparatively greater than the space provided between the walls of the housing and the recess 41 and it is preferably bonded or caused to adhere to the exterior surface of the bearing seats 37 and 38 for the purpose of ease in assembly. However, the cushion or rubber annulus 44 may form an independent member without departing from the spirit of the invention. The flanges of the bearing seats 37 and 38 which define the recess 41 serve to confine and prevent the spreading of the rubber member 44 when the same is put in place in the housing into snug engagement with the interior walls of the housing. It is highly desirable that the cushion member 44 be of such dimensions as to be normally compressed in order that the same will exert a substantially lateral pressure against the bearing means or seats 37 and 38 to hold the same in constant operable engagement with the expansible ball-shaped configuration of the stud and thus automatically compensate for any wear of the bearing surfaces of the joint, serving also as a shock absorbing means and a noise preventing medium.

The interior of the housing 14 at its lower portion is formed with a cylindrical recess 45 of larger diameter than the cylindrical configuration which accommodates the bearing seats 37 and 38 and fitted into this recess is an inverted cup-like metal closure 47, the closure 47 being held in place by means of swaging a portion of the housing into engagement with the exterior surface of the cup as shown at 48 to seal the lower portion of the housing. The upper edge 50 of the cup-like closure 47 engages the shoulder 52 formed by the junction of the cylindrical walls of different diameters in the interior of the housing, the shoulder 52 forming a stop or positioning means for the closure 47. The edge 50 also engages the lower surfaces of the bearing seats 37 and 38 serving with the upper flange 20 of the housing 14 to hold the bearing seats against vertical movement in the housing.

The coil spring 36 expanding outwardly serves to forcibly urge the spherical portion of the stud member 30 into proper engagement with the longitudinally spaced members 31 and 32 urging these members into bearing engagement with the split non-metallic seats 37 and 38, compressing the yieldable member 44 against the interior wall of the housing so that the elements of the joint are at all times resiliently maintained in proper engaging relationship preventing pounding out of the bearing elements. The expansible action of the spring and the resilient lateral pressure upon the bearing seats by the yieldable means used to mount the same, function at all times to take up shocks and compensate for any wear of the several bearing surfaces so as to eliminate noises and looseness between the cooperating elements of the joint.

The upper exterior periphery of the housing 14 is provided with a peripheral groove or recess 54 and fitting into this recess is a circular bead 55 integrally formed as a part of a flexible closure or boot structure 56 of rubber or other flexible material. As illustrated in Figure 1, the beading 55 preferably encircles a metal wire reinforcement 57 which may be embedded therein, the wire ring 57 acts to hold the beading 55 in tight engagement in the groove 54 of the housing to form a seal. The upper portion of the boot structure 56 is also provided with a beading 58 which retains or on which is moulded a wire reinforcement 59, the beading 58 surrounding the stud member adjacent the lower surface of the arm 24. The beading 58 of the boot structure adheres to the stud member 22 and provides a seal between the boot and the stud member.

The space formed between the lower surface of the curved portion 30 of the stud member 22 and the interior surface of the members 31 and 32 serves as a chamber to retain suitable lubricating means for the bearing surfaces of the joint construction. The space between the exterior flattened surfaces 34 and 35 of the members 31 and 32 and closure 47 serves also as a lubricant reservoir which is in communication with the first mentioned reservoir through a space formed by curved edge portions 59 imparted to the flattened sections of the members 31 and 32 as particularly shown in Figures 1 and 6. When the joint structure is assembled the reservoirs so formed are filled with suitable lubricant and after the closure 47 is secured in place and the upper portion of the housing is closed by the flexible boot structure 56, there is provided a completely sealed joint structure embodying an ample supply of lubricant for the bearing surfaces, which is sufficient for the life of the joint structure without further lubrication. The lubricant will be distributed to all the parts contained in the housing due to the longitudinal separation which is provided not only of the members 31 and 32 but that of the bearing seats 37 and 38 so that the constant flow of lubricant to all the bearing surfaces will be assured under all conditions of operation. It should be noted that the bearing members 37 and 38 are independent of each other except for their being bonded to or held in place by the rubber cushion 44 and the latter being resilient, may be sufficiently stretched during assembly operation to permit bearing members 37 and 38 to surround the ball configuration of the stud member formed by members 31 and 32.

In the modified form of the invention shown in Figures 9 to 11 inclusive the tie rod housing 14' is of hollow configuration having the interior walls tapering or converging slightly at the upper portion which terminates in an inwardly extending annular flange or shoulder 20'. Projecting into the housing is a stud member 22' having a stem of similar configuration to that of the stud shown in Figure 1. However, the lower portion of the stud 22' is formed with a segmental spherical or partial ball-shaped portion 30' which terminates in a cylindrical flange portion 61 of lesser diameter than the ball-shaped portion 30'. Positioned immediately beneath the segmental spherical portion 30' of the stud is a cup-like member 62 formed with a segmental spherically shaped exterior of the same radius of curvature as the spherical shape of portion 30' of stud 22'. The member 62 is preferably formed of sheet metal or the like and is provided at its upper interior edge with a cylindrical surface 64 which snugly fits over the flange portion 61 of the stud member so that their respective exterior surfaces form an interlocked substantially ball-shaped configuration.

In the form of the invention shown in Figures 9 to 11 inclusive, the metallic ball-shaped configuration of the stud 22' formed by the spherically shaped portion 30' and that of member 62 is substantially surrounded by the bearing arrangement of the invention which is produced by moulding a synthetic resin plastic composition to similarly shaped semi-annular bearing members 65 and 66, each having spherically shaped inner surfaces 67 and 68 and corresponding outer surface 70 and 71. The concave inner surfaces 67 and 68 of the bearing members are generated on the center of the spherically shaped configuration of the stud and are arranged to properly fit the same providing a substantial curved bearing area between these elements. Interposed between the outer surfaces 70 and 71 of the bearing members 65 and 66 and the interior converging wall of the housing is a member or cushion 73 of yieldable material which may be of rubber, synthetic rubber, or the like. In this form of the invention it is preferable that the rubber cushion 73 be bonded or caused to adhere to each of the exterior surfaces 70 and 71 of the bearing seats 65 and 66 for purposes of assembly, but the elements may be assembled separately without departing from the spirit of the invention. The lower portion of the housing is sealed by means of a circular disk-like closure or member 75 having a centrally depressed portion 76 and an upwardly extending circular raised portion 78, the closure being held in place by swaging a peripheral flange portion of the housing over the edge of the closure disk as illustrated at 81. In assembling the joint elements and rubber cushion 73, the latter would normally extend downwardly below the position of the disk 75. However, it is desirable that the cushion 73 be substantially compressed by the disk 75 in order that the cushion exert substantial lateral pressure against the bearing members 65 and 66 to hold the latter in constant operable engagement with the ball configuration 30' of the stud and member 62, and thus automatically compensate for any wear of the bearing elements of the joint. The upwardly extending circular raised portion or shoulder 78 on the closure disk 75 serves to prevent the compressed rubber cushion 73 from "creeping."

The upper portion of the housing 14' is provided exteriorally with a peripheral groove or recess 54' and fitting into this recess is a circular bead 55' integrally formed as a part of a flexible boot 56' of rubber or other suitable flexible material, similar in construction to the one shown in Figure 1 providing sealing means between the stud and tie rod housing.

It is to be noted that the lower extremity of the segmental spherical portion 30' of the stud forms with the interior of the hollow cup-like member 62 a lubricant reservoir. The space between the lower surface of the cup member 62 and closure 75 also forms an additional lubricant reservoir. During the assembly of the joint structure, the space between the flange portion 61 of the stud and the hollow portion of cup 62, as well as the space between the lower surface of cup 62 and closure 75 are filled with suitable lubricant, and with the upper portion of the housing sealed by the flexible boot 56', there is provided a completely lubricated and sealed joint structure embodying an ample supply of lubricant for the bearing surfaces. Thus, the bearing surfaces will remain in satisfactory operating condition throughout the life of the joint structure without further lubrication. While the lubricant will seep through the horizontal annular crevice at the juncture of the spherical portion 30' of the stud member with the cup 62, it may be desirable to provide additional openings such as 92 to enhance the flow of lubricant to the bearing surfaces of members 65 and 66. It should be noted that the bearing members 65 and 66 while they are longitudinally spaced with respect to the axis of the housing are independent of each other except for their being bonded to the rubber cushion 73 and the latter being resilient, may be sufficiently stretched during assembly operation to permit bearing members 65 and 66 to surround the ball configuration 30' of the stud member and cup 62.

In the joint structure of the invention shown in Figures 9 to 11 inclusive, all mechanical spring devices have been eliminated for holding the joint elements in their proper relationship as the rubber cushion 73 provides the necessary resilient lateral pressure upon the bearing surfaces forming an effective yet highly efficient joint construction, the resilient cushion taking up shock and also automatically compensating for any wear of the bearing surfaces which may occur.

In the use of bearing elements fabricated of a synthetic plastic resin including those produced by moulding a phenol condensation product, I have found that they inherently embody a certain degree of resiliency so that they are not rendered brittle and provide a very satisfactory bearing means for surrounding the ball configuration of the joint. I have also found that in utilizing bearing elements of this nature that they require little or no lubrication and in use show very little wear. I attribute this to the fact that such a bearing means in contact with a steel ball configuration becomes a highly polished surface which shows no appreciable wear in use even when unlubricated.

I have found it desirable to utilize a graphite bearing lubricant in a joint of the constructions above described or a lubricant which does not have serious deleterious effect upon the rubber, thus avoiding any disintegration or impairment of the rubber cushion which retains the bearing means in contact with the ball configuration.

It is apparent that, within the scope of the invention, modifications and different arrangements may be made other than is herein disclosed, and the present disclosure is illustrative merely, the invention comprehending all variations thereof.

What I claim is:

1. In combination, a hollow housing; a stud member having an enlarged portion projecting into said housing; a plurality of metallic elements substantially surrounding the enlarged portion of said stud member, the exterior lateral surfaces of said elements forming together a ball-shaped configuration; a pair of similarly shaped non-metallic bearing seats having curved inner surfaces in engagement with the ball-shaped configuration; yieldable means interposed between said bearing seats and the interior walls of said housing; spring means positioned within said elements and beneath said stud member for resiliently urging said elements into engagement with said non-metallic bearing seats; a closure for the lower end of said hollow housing; and closure means engageable with said housing and said stud member forming a sealed joint construction.

2. In combination, a housing having a hollow interior; a stud member having a portion projecting into said housing; a pair of semi-annular elements carried by said stud member being separated longitudinally with respect to the axis of the housing, the exterior surfaces of said elements forming together a ball-shaped configuration; a pair of non-metallic bearing seats having curved inner surfaces in bearing engagement with said ball configuration; yieldable means interposed between said seats and the interior walls of said housing; resilient means positioned within said elements for urging said elements into engagement with said bearing seats; and closure means for one end of the hollow interior of said housing forming a sealed joint construction.

3. In combination, a hollow housing; a stud member having a segmental spherically shaped portion projecting into said housing; a pair of semi-annular elements substantially surrounding and in engagement with the segmental spherically shaped portion of said stud member, the exterior surfaces of said elements forming together substantially a ball-shaped configuration; non-metallic yieldably mounted bearing means interposed between said elements and the interior walls of said housing, said bearing means having an inner surface in bearing engagement with the ball configuration; and resilient means positioned within said elements for urging said elements into engagement with said bearing seats; and closure means for said housing.

4. In combination, a hollow housing; a stud member having an enlarged portion projecting into said housing; a plurality of metallic elements substantially surrounding the enlarged portion of said stud member, the exterior lateral surfaces of said elements forming together a ball-shaped configuration; a pair of similarly shaped bearing seats formed of synthetic resin composition having curved inner surfaces in engagement with the ball-shaped configuration; yieldable means interposed between said bearing seats and the interior walls of said housing; spring means positioned within said elements and beneath said stud member for resiliently urging said elements into engagement with said bearing seats; and closure means for said housing.

5. In combination, a housing having a hollow interior; a stud member having a portion projecting into said housing; a pair of semi-annular elements carried by said stud member being separated longitudinally with respect to the axis of the housing, the exterior surfaces of said elements forming together a ball-shaped configuration; a pair of bearing seats formed of phenolic condensation product having curved inner surfaces in bearing engagement with said ball configuration; yieldable means interposed between said seats and the interior walls of said housing; resilient means positioned within said elements for urging said elements into engagement with said bearing seats; and closure means for the ends of said housing.

WILLIAM A. FLUMERFELT.